United States Patent
Hess

(10) Patent No.: US 10,701,791 B2
(45) Date of Patent: Jun. 30, 2020

(54) METHOD AND DEVICE FOR PREDICTING THE LIFETIME OF AN X-RAY GENERATOR

(71) Applicant: Smiths Heimann GmbH, Wiesbaden (DE)

(72) Inventor: Gregor Hess, Wiesbaden (DE)

(73) Assignee: Smiths Heimann GmbH, Wiesbaden (DE)

(*) Notice: Subject to any disclaimer, the term of this patent is extended or adjusted under 35 U.S.C. 154(b) by 0 days.

(21) Appl. No.: 14/487,487

(22) Filed: Sep. 16, 2014

(65) Prior Publication Data

US 2015/0006093 A1    Jan. 1, 2015

Related U.S. Application Data

(63) Continuation of application No. PCT/EP2013/054579, filed on Mar. 7, 2013.

(30) Foreign Application Priority Data

Mar. 16, 2012 (DE) .................. 10 2012 204 138

(51) Int. Cl.
*H05G 1/54* (2006.01)
*H05G 1/26* (2006.01)
*G06F 17/18* (2006.01)

(52) U.S. Cl.
CPC ............ *H05G 1/54* (2013.01); *G06F 17/18* (2013.01); *H05G 1/26* (2013.01)

(58) Field of Classification Search
CPC ........................................................ H05G 1/54
USPC ......................................... 702/183, 184, 185
See application file for complete search history.

(56) References Cited

U.S. PATENT DOCUMENTS

| | | | |
|---|---|---|---|
| 6,351,517 B1 | 2/2002 | Guru et al. | |
| 6,426,997 B1 | 7/2002 | Fuchs et al. | |
| 6,453,009 B2 | 9/2002 | Berezowitz et al. | |
| 7,302,041 B2 | 11/2007 | Deuringer et al. | |
| 2001/0031036 A1* | 10/2001 | Berezowitz et al. | 378/118 |
| 2003/0009311 A1* | 1/2003 | Ushiku | F04B 49/065 702/184 |
| 2005/0157849 A1* | 7/2005 | Radley | H05G 1/54 378/207 |
| 2006/0008053 A1* | 1/2006 | Ishikawa | H05G 1/30 378/111 |
| 2007/0189463 A1* | 8/2007 | Deuringer et al. | 378/207 |
| 2009/0072626 A1* | 3/2009 | Watanabe | H02M 3/1588 307/85 |
| 2010/0189227 A1* | 7/2010 | Mannar | A61B 6/586 378/207 |
| 2012/0138782 A1* | 6/2012 | Simon | G01V 5/125 250/254 |

FOREIGN PATENT DOCUMENTS

| | | |
|---|---|---|
| DE | 100 11 294 A1 | 10/2000 |
| DE | 103 38 693 B3 | 5/2005 |

* cited by examiner

*Primary Examiner* — Michael J Dalbo
(74) *Attorney, Agent, or Firm* — Muncy, Geissler, Olds & Lowe, P.C.

(57) ABSTRACT

In order to predict the lifetime of an X-ray generator, the data of at least one physical variable which influences the lifetime of the generator are regularly stored. The stored data are evaluated by means of stored statistics in order to determine the expected remaining lifetime of the X-ray generator.

14 Claims, 1 Drawing Sheet

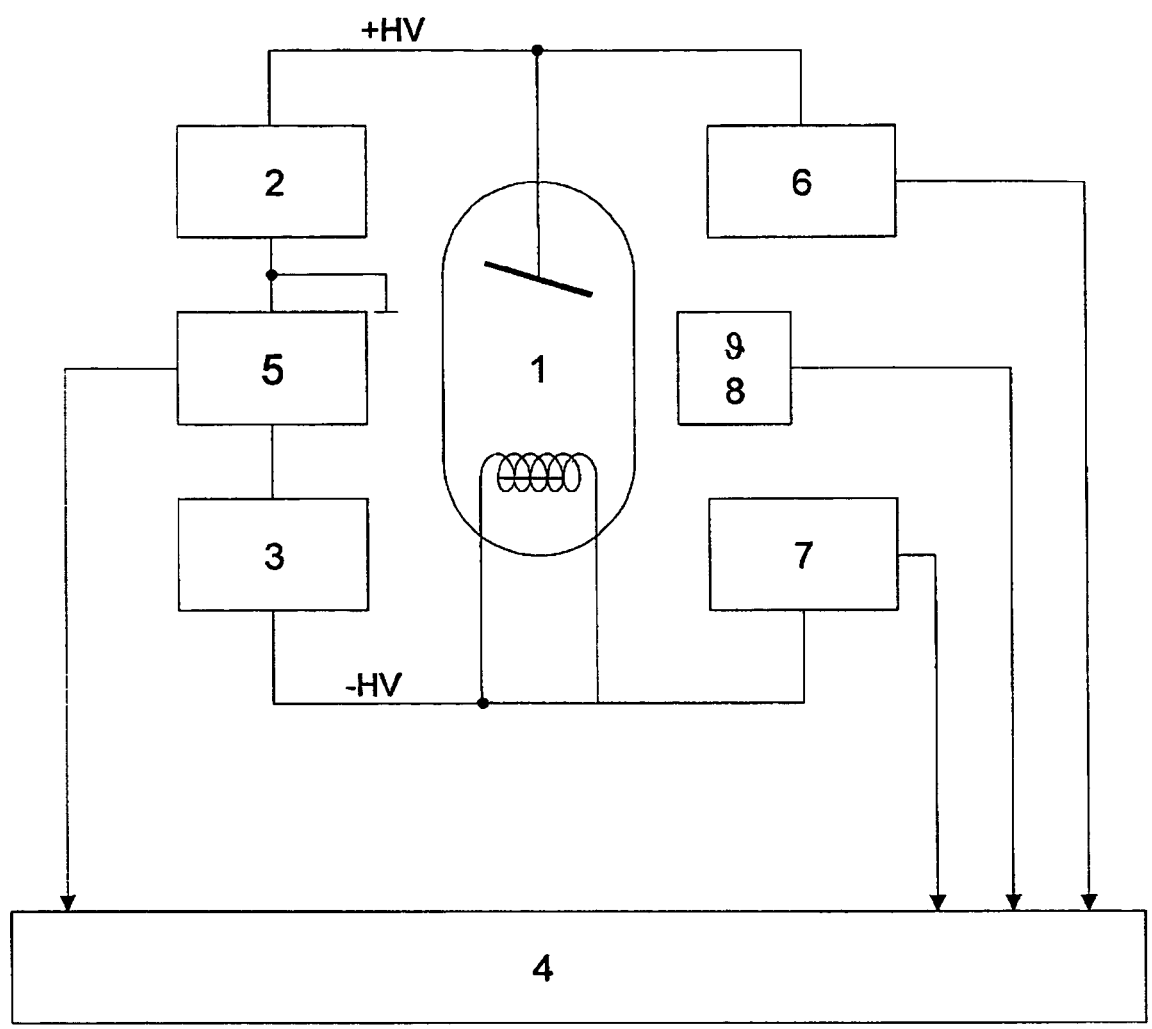

METHOD AND DEVICE FOR PREDICTING THE LIFETIME OF AN X-RAY GENERATOR

This nonprovisional application is a continuation of International Application No. PCT/EP2013/054579, which was filed on Mar. 7, 2013, and which claims priority to German Patent Application No. DE 102012204138.9, which was filed in Germany on Mar. 16, 2012, and which are both herein incorporated by reference.

BACKGROUND OF THE INVENTION

Field of the Invention

The present invention relates to a method and a device for predicting the lifetime of an X-ray generator, which preferably is part of an X-ray screening device by which objects are irradiated in order to inspect their contents.

Description of the Background Art

As is generally known, inspection systems with X-ray screening devices, which contain X-ray generators to generate X-rays, are used for security checks of carry-on luggage and other objects carried by persons, for example, at airports.

X-ray generators have a finite lifetime. In the case of failure, they must be replaced quickly for the inspection system to be functional again. Because the failure of a generator is usually unexpected, during the time needed for obtaining and installing a replacement generator, the X-ray screening system is idle.

SUMMARY OF THE INVENTION

It is therefore an object of the present invention to provide a method to reduce the downtime of the X-ray screening system during a failure of a generator.

The object is attained in an embodiment by routinely determining and storing the data of at least one physical variable that influences the lifetime of the generator and evaluating the stored data by means of statistics, in order to determine the expected remaining lifetime of the X-ray generator.

Determining the expected remaining lifetime of the X-ray generator can provide a timely warning of an impending generator failure. A service organization can be notified as part of remote maintenance, which then has sufficient lead time for preparing a generator replacement. The downtime of the X-ray system can be reduced in this way.

Moreover, the storage of replacement generators can be optimized and thus service costs can be reduced.

The generator electronics can contain a component whereby the data are saved and the statistics are stored.

Variables especially relevant to the lifetime can be tracked by acquiring and recording the high voltage of the X-ray tube, the target current, and/or the temperature of the X-ray tube. The thermal load (both the current and accumulated load) and short-term signal deviations, which indicate arcing, can be derived directly from these. Preferably the number and/or the rate of arcing events are determined from the signal deviations.

If the operating times and standby times of the generator are also recorded, statistical information can be compiled with a sufficient number of measurements (data logs) that are relevant to the lifetime of an X-ray tube.

In a system with comparable components, the data acquisition system can be configured so that comparisons from a sufficient number of evaluated data from sample measurements enable the compiling of statistical information which is stored and with current measurements enables the determination of the statistical remaining life expectancy of the X-ray tubes and/or other critical components of the generator.

The invention will be described in greater detail below with use of a preferred exemplary embodiment:

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole figure shows schematically the structure of an X-ray generator with an X-ray tube.

DETAILED DESCRIPTION

The X-ray generator is used to generate X-rays and is part of an X-ray screening device to irradiate objects for the inspection of their contents. Such X-ray screening devices are used for inspecting carry-on baggage and other objects carried by persons, for example, at airports.

The X-ray screening device contains an X-ray tube 1, which in the exemplary embodiment is connected in a bipolar manner to a positive high-voltage source 2 and a negative high-voltage source 3. Alternatively, X-ray tube 1 can also be made unipolar, so that only a positive or negative high voltage is applied.

A data acquisition and evaluation system 4, for example, a microprocessor, is integrated as a component in the electronics, preferably in the electronics of the X-ray generator. Data acquisition and evaluation system 4 contains a data logger with data memories, which is connected to a measuring device 5 for the tube current, a measuring device 6 for the positive high voltage, a measuring device 7 for the negative high voltage, and to a temperature measuring device 8. The values determined by measuring devices 5-8 are stored at regular, predetermined time intervals in data acquisition and evaluation system 4. In addition, the standby times and the operating times of X-ray tube 1 are recorded.

The recorded data are analyzed at regular intervals. Thus, the last standby and operating time, the current and accumulated thermal load, and short-term signal deviations, which indicate arcing, can be derived directly. Preferably the number and/or the rate of arcing events are determined from the signal deviations.

With a sufficient number of measurements, this makes it possible to compile statistical information for a system with comparable components. Thus, the average lifetime of an X-ray tube can be determined statistically depending on the standby and operating time, the reduction of the lifetime by the tube's thermal load, the reduction of the lifetime depending on the number of arcing events, and the reduction of the lifetime depending on the number and frequency of arcing events, particularly within a short time period.

The thus acquired statistical data can be stored in a data acquisition and evaluation system 4 of an X-ray generator with comparable components. Thus, determined values of the generator can be compared with the statistically analyzed data of the comparative measurements in order to determine the statistically expected remaining lifetime of X-ray tube 1 and other critical high-voltage components. Conversely, a prediction of the failure probability for the X-ray generator can be made in this way. It is therefore possible to take appropriate precautionary measures in a timely manner to keep the downtime of the X-ray screening device as short as possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for predicting a lifetime of an X-ray generator, the method comprising:
   recording a high voltage, a target current, a temperature, a thermal load, a total operating time and a total standby time of a first X-ray tube via a positive voltage measuring device, a negative voltage measuring device and a temperature measuring device;
   storing a plurality of recorded variables to memory, wherein the recorded variables comprise the high voltage, the target current, the temperature, the thermal load, the total operating time, and the total standby time of the first X-ray tube;
   analyzing the stored plurality of recorded variables to determine a plurality of predictors of X-ray tube failure;
   storing the plurality of predictors in a database;
   evaluating a second X-ray tube with the stored predictors in order to determine the expected remaining lifetime of the second X-ray tube;
   notifying a user with a precautionary measure or the expected remaining lifetime; and
   replacing the second X-ray tube in response to the notifying of the user.

2. The method according to claim 1, wherein at least one of a high voltage, a target current, or a temperature of the second X-ray tube are evaluated and stored.

3. The method according to claim 1, wherein at least one of an operating time or a standby time of the second X-ray tube are stored.

4. The method according to claim 1, wherein a last standby and a last operating time, a thermal load of the second X-ray tube and short-term signal deviations are derived directly from current measurements.

5. The method according to claim 4, wherein at least one of a number or a rate of arcing events are determined from the signal deviations.

6. The method according to claim 1, wherein the stored predictors are used in current measurements to determine the remaining life expectancy of at least one of the second X-ray tube or other critical components of an X-ray generator.

7. The method according to claim 1, wherein a last standby timestamp, a last operating time, a high voltage, a target current, and a temperature of the second X-ray tube are stored and evaluated to determine the expected remaining lifetime of the second X-ray tube.

8. The method according to claim 1, wherein the recorded variables further comprise: a time stamp of a last standby time of the first X-ray tube.

9. The method according to claim 1, wherein the recorded variables further comprise: a time stamp of a last operating time of the first X-ray tube.

10. The method according to claim 1, wherein the recorded variables further comprise: a time stamp at high voltage.

11. A device for estimating an X-ray tube lifetime, comprising:
    an X-ray tube;
    a positive voltage measuring device, a negative voltage measuring device, and a temperature measuring device connected to the X-ray tube;
    a database storing a plurality of predictors of the X-ray tube lifetime, the predictors determined by analyzing a plurality of recorded variables from other X-ray tubes including a high voltage, a target current, a temperature, a thermal load, a total operating time and a total standby time;
    a monitoring circuit containing a data acquisition circuit and an evaluation circuit, the data acquisition circuit connected to the positive voltage measuring device, the negative voltage measuring device and the temperature measuring device,
    wherein the data acquisition circuit receives and stores data including the high voltage, the target current, the total operating time, the total standby time, and the temperature of an X-ray tube, and wherein the evaluation circuit compares the stored data with the plurality of predictors to determine the expected remaining lifetime of the X-ray tube; and
    a notification system that notifies a user with a precautionary measure or the expected remaining lifetime, and wherein the X-ray tube is replaced in response to the notifying of the user.

12. The device of claim 11, wherein a last standby and a last operating time, a thermal load of the X-ray tube and short-term signal deviations are derived directly from the data stored by the data acquisition circuit.

13. The device of claim 11, wherein a number and a rate of arcing events are determined from the signal deviations.

14. A method for predicting a lifetime of an X-ray generator, the method comprising:
    recording a voltage, a target current, a temperature, a thermal load, a total operating time and a total standby time of a first X-ray tube via a positive voltage measuring device, a negative voltage measuring device and a temperature measuring device;
    storing a plurality of recorded variables to memory, wherein the variables comprise the voltage, the target current, the temperature, the thermal load, the total operating time, and the total standby time of the first X-ray tube;
    analyzing the stored plurality of recorded variables to determine a plurality of predictors of X-ray tube failure;
    storing the plurality of predictors in a database;
    evaluating a second X-ray tube with the stored predictors in order to determine the expected remaining lifetime of the second X-ray tube;
    notifying a user with a precautionary measure or the expected remaining lifetime; and replacing the second X-ray tube in response to the notifying of the user.

\* \* \* \* \*